United States Patent [19]

Tomlinson et al.

[11] Patent Number: 5,491,971

[45] Date of Patent: Feb. 20, 1996

[54] CLOSED CIRCUIT AIR COOLED GAS TURBINE COMBINED CYCLE

[75] Inventors: Leroy O. Tomlinson, Schenectady; Raub W. Smith, Clifton Park; John E. Sholes, Delanson, all of N.Y.

[73] Assignee: General Electric Co., Schenectady, N.Y.

[21] Appl. No.: 172,243

[22] Filed: Dec. 23, 1993

[51] Int. Cl.⁶ ................................................. F02C 6/00
[52] U.S. Cl. ................................................. 60/39.182
[58] Field of Search ..................... 60/39.182; 415/115, 415/117

[56] References Cited

U.S. PATENT DOCUMENTS

| | | | |
|---|---|---|---|
| 3,150,487 | 9/1964 | Mangan et al. | 60/39.182 |
| 3,691,760 | 9/1972 | Vidal et al. | 60/39.182 |
| 3,879,616 | 4/1975 | Baker et al. | 60/39.182 |
| 4,288,979 | 9/1981 | Liljedahl et al. | 60/39.182 |
| 4,424,668 | 1/1984 | Mukherjee | 60/39.182 |
| 4,576,124 | 3/1986 | Martens et al. | 60/39.182 |
| 4,891,937 | 1/1990 | Noguchi et al. | 60/39.182 |
| 4,932,204 | 6/1990 | Pavel et al. | 60/39.182 |
| 4,991,391 | 2/1991 | Kosinski | 60/39.182 |
| 5,174,107 | 12/1992 | Ogawa et al. | 60/39.182 |
| 5,199,256 | 4/1993 | Moore | 60/39.182 |
| 5,255,507 | 10/1993 | Gounder | 60/39.182 |
| 5,285,629 | 2/1994 | Gounder | 60/39.182 |

OTHER PUBLICATIONS

"Combined Cycle Power Plants for Load Cycling Duties", American Power Conference, Apr. 24–27, 1989.

35th GE Turbine State-of-the-Art Technology Seminar, "Steam Turbines for Advanced Combined Cycles", Bailey et al., 1991.

35th GE Turbine State-of-the-Art Technology Seminar, "GE Combined-Cycle Product Line and Performance", Tomlinson et al., 1991.

Primary Examiner—Timothy S. Thorpe
Attorney, Agent, or Firm—Nixon & Vanderhye

[57] ABSTRACT

In a combined cycle system (10) which includes a gas turbine (12), a steam turbine (20); and at least one heat recovery steam generator (34) including evaporator(s) (38, 42, 46) operating at one or more pressures, and where condensate from the steam turbine (20) is evaporated by exhaust gas from the gas turbine (12) and returned to the steam turbine (20), the improvement comprising a closed loop cooling air circuit arranged such that hot cooling air from the gas turbine (12) is passed in heat exchange relationship with water from that one or more of the evaporators (46) in the heat recovery steam generator (34).

10 Claims, 1 Drawing Sheet

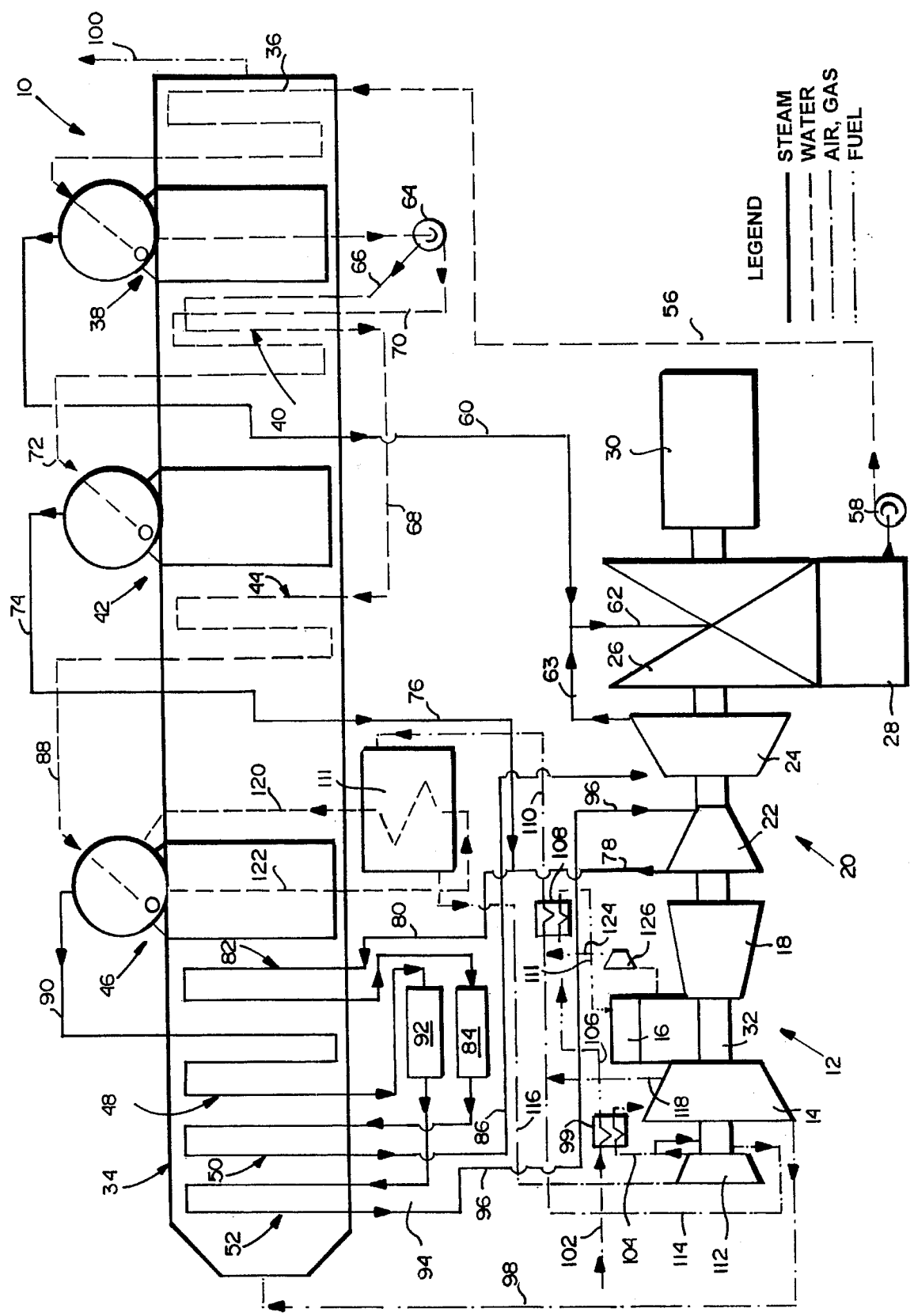

5,491,971

CLOSED CIRCUIT AIR COOLED GAS TURBINE COMBINED CYCLE

TECHNICAL FIELD

This invention relates to a novel combined cycle power system consisting of a gas turbine and Rankine steam cycle in which the gas turbine hot gas path parts are cooled by a closed circuit air cooling loop that transfers the heat removed from the gas turbine to an evaporator in the Rankine steam bottoming cycle.

BACKGROUND PRIOR ART

In combined cycle power systems, the exhaust heat of a gas turbine is recovered in a heat-recovery steam generator (HRSG), followed by steam turbine expansion. In current practice, cooling of gas turbine hot gas path parts is performed by air extracted from the gas turbine compressor and discharged from the cooled part to the hot gas path. The efficiency of this configuration is reduced because the air performing gas turbine hot gas path part cooling, other than that which cools the turbine first stage nozzle, is extracted from the compressor at one or more stages and expanded to the lower turbine gas path pressures without performing useful work. Furthermore, the conventional current practice of open circuit part cooling using compressor extraction air has the undesirable side effect of reducing the quantity of air available for combustion. Thus, in relation to a machine with less compressor air extraction, the current practice requires a higher combustion temperature for a given fuel flow, which in turn yields higher emissions of oxides of nitrogen (NOx).

In prior installations with closed loop cooling systems, the gas turbine cooling duty provides superheated steam for the Rankine steam bottoming cycle. This arrangement reduces the duty of the superheater in the high pressure section of the HRSG, which leaves more energy available to the high pressure evaporator. As a result, the heat that is transferred from the exhaust gas to the steam cycle with a high temperature difference is increased.

U.S. Pat. No. 4,424,668 describes a closed circuit steam cooled gas turbine system which uses steam generated in a low pressure section of a two pressure Rankine steam bottoming cycle. In this system, energy removed from the gas turbine is applied in the low level section of the bottoming cycle, thereby compromising the ability to achieve high thermal efficiency.

DISCLOSURE OF THE INVENTION

In accordance with an exemplary embodiment of this invention, the gas turbine hot gas path is cooled by a closed loop system using air as the cooling fluid. This cooling fluid is circulated by a compressor that may be driven from the gas turbine shaft, electric motor or other driver between the gas turbine and an evaporative heat exchanger associated with a heat recovery steam generator (HRSG). In other words, the cycle in accordance with this invention transfers the heat from the gas turbine cooling circuit to the high pressure evaporator. This increases the steam generated and superheated by the heat recovered from the gas turbine exhaust gas which increases the output of the steam cycle.

More specifically, the gas turbine air cooling loop extends from a gas turbine shaft driven compressor to a water evaporating heat exchanger (by suitable piping or ducting) that evaporates water for the Rankine steam bottoming cycle in the HRSG, operating in parallel with the evaporator that utilizes heat recovered from the gas turbine exhaust gas or other energy source.

The evaporative heat exchanger/air cooler may operate with either natural or forced circulation. In combined cycles, with multiple steam generation systems in the exhaust heat recovery steam generator generating steam at progressively lower pressures as the exhaust gas is cooled, the heat is primarily transferred to the evaporator operating at the highest pressure. Depending on the particulars of the steam bottoming cycle and the coolant needs of the gas turbine, multiple evaporating heat exchangers corresponding to the exhaust heat recovery steam generator pressures can be incorporated into the system.

In the exemplary embodiment, makeup air is supplied to the closed circuit cooling loop from the discharge of the gas turbine air compressor. The makeup air enters the cooling loop at any point upstream of the circulating compressor suction, and downstream of the gas turbine cooling system discharge. The preferred makeup air entrance point is upstream of the evaporating heat exchanger so that all of the cooling air is cooled to a temperature near the saturation temperature of the water being evaporated. The circulating compressor increases the cooling air pressure to a level higher than the pressure in the gas turbine gas path, so that any leakage is from the cooling circuit to the gas turbine hot gas path. If desired, a compressor may be incorporated in the air makeup system to increase the pressure of the cooling circuit above the gas turbine compressor discharge pressure. Higher pressure increases the heat transport characteristics and reduces the size and cost of the piping in the evaporating heat exchanger.

The bottoming steam cycle in accordance with this invention may be reheat or non-reheat.

In the preferred arrangement, two heat exchanger systems are included in the air cooling loop: (1) a stator cooling air stream is used to reduce the temperature of the stator cooling air and to increase the temperature of the fuel in a low temperature stage; and (2) the closed loop air cooling stream is used to further increase the temperature of the fuel in a high temperature stage at the discharge of the gas turbine cooling system. The fuel heating system may incorporate heat exchangers that transfer heat directly from the cooling air circuit to the fuel or via an intermediate inert fluid.

The invention described herein can be embodied such that part of the gas turbine hot gas path cooling duty is performed by air extracted directly from the gas turbine compressor and discharged to the hot gas path after performing its cooling duty. In particular, cooling of the gas turbine first stage nozzle by extracted air improves cycle performance when combined with closed loop cooling of the remaining hot gas path parts that require cooling.

The gas turbine cooling system in accordance with this invention also can be configured to perform film cooling of some hot gas path components by discharging part of the cooling air through film cooling ports to the gas turbine hot gas path. This provides effective part cooling but reduces cycle efficiency.

Accordingly, in its broader aspect, the present invention relates to a combined cycle system which includes a gas turbine, a steam turbine, and at least one heat recovery steam generator where condensate from the steam turbine is evaporated by exhaust gas from the gas turbine and introduced into the steam turbine, the improvement comprising a closed loop cooling circuit arranged such that hot cooling air from the gas turbine is passed in heat exchange relationship with water from a high pressure evaporator in the heat recovery steam generator.

BRIEF DESCRIPTION OF THE DRAWINGS

The sole FIGURE is a schematic diagram of a combined gas turbine and steam cycle incorporating a closed loop air cooling circuit in accordance with this invention.

BEST MODE FOR CARRYING OUT THE INVENTION

With reference to the single drawing FIGURE, the invention is incorporated in a multi-pressure reheat combined cycle power generation system 10. This system includes a gas turbine 12 comprising a compressor 18, a combustion system 16 and a gas turbine component 14. A steam turbine 20 includes a high pressure turbine section 22, an intermediate pressure turbine section 24, and one or more low pressure sections 26 with multiple admission points at different pressures. The low pressure section 26 also includes a condenser 28. The steam turbine 20 drives a generator 30 which produces, for example, electrical power and/or thermal energy. The gas turbine 12, steam turbine 20 and generator 30 in the exemplary system 10 are arranged in tandem, on a single shaft 32, but the invention is also applicable to multi-shaft arrangements.

The steam turbine system 20 is associated with a multi-pressure heat recovery steam generator (HRSG) 34 which includes a low pressure economizer 36, a low pressure evaporator 38, a high pressure and intermediate pressure economizer 40, an intermediate pressure evaporator 42, a high pressure economizer 44, a high pressure evaporator 46, a first high pressure superheater 48, a high pressure reheater 50, and a second high pressure superheater 52, all arranged in conventional fashion.

In this system, generally, condensate from the steam turbine low pressure section 26 is fed from the condenser 28 to the HRSG 34 via conduit 56, with the aid of pump 58. Condensate subsequently passes through the LP economizer 36 and into the LP evaporator 38. Steam from the LP evaporator 38 is fed to the low pressure section 26 of the steam turbine 20 via conduits 60 and 62, in combination with steam from the intermediate pressure section 24 (via conduit 63).

Feed water is removed from the LP evaporator 38 and, with the aid of pump 64, passed (1) through the HP and IP economizer 40 via conduit 66 and then to the high pressure economizer 44 via conduit 68; and (2) through the HP and IP economizer 40 via conduit 70 and then to the IP evaporator 42 via conduit 72.

Steam from the IP evaporator 42 flows via conduits 74 and 76 and is combined with steam from the HP turbine section 22 via conduit 78 and flows via conduit 80 to a reheater 82. Steam from the reheater 82 then passes through attemporator 84, reheater 50, and then to the steam turbine IP section 24 via conduit 86.

During this time, condensate in the HP economizer 44 is passed to the high pressure evaporator 46 via conduit 88. Steam exiting the high pressure evaporator 46 via conduit 90 passes through the superheater 48, attemporator 92 and then through superheater 52 (via conduit 94). Superheated steam is then introduced into the high pressure section 22 of the steam turbine 20 by way of conduit 96.

As in conventional combined cycle systems, heat is provided to the HRSG 34 by the exhaust gases from the gas turbine 12 via conduit 98 which exit the HRSG 34 via stack 100 at the opposite end of the HRSG.

Fuel is introduced into the combustion system 16 via conduit 102 which feeds the fuel through a low temperature fuel heater 99, where it passes in heat exchange with hot air extracted from the gas turbine via conduit 104 and then, via conduit 106 through a high temperature fuel heater 108 where the fuel passes in heat exchange relationship with the hot air in the closed circuit air cooling loop described further below. The fuel then enters the combustion system 16 via conduit 111.

Heating of the gas turbine fuel by the air cooling loop can further improve the efficiency of the power generation cycle. As illustrated in the FIGURE, the low temperature fuel heater 99 is supplied with heat by a stator cooling air stream for reducing the temperature of the stator cooling air while the high temperature fuel heater 108 is supplied with heat directly within the cooling air circuit as already mentioned. The fuel heating system may incorporate heat exchangers that transfer heat directly from the cooling air circuit to the fuel or intermediate inert fluid may also be applied.

In accordance with this invention, the gas turbine hot gas path parts are cooled by a closed circuit air cooling loop that transfers the heat removed from the gas turbine 12 to the evaporating heat exchanger 111. More specifically, the hot gas path cooling duty includes: a cooling air circulating compressor 112 in a closed loop, discharging 1) to the rotating turbine components, and 2) to the stationary turbine components first passing through low temperature fuel heater 99 via hot air or gas conduit 104, the cooling flow from the rotating and stationary turbine components then combine via hot air or gas conduits 114 and 118, respectively, the high temperature fuel heater 108, to the evaporating heat exchanger 111 via hot air or gas conduit 110, and then back to the cooling air circulating compressor 112 via hot air or gas conduit 116. It will be appreciated that the compressor 112 may be driven from the gas turbine shaft 32, or, alternatively, may be driven by an electric motor or other suitable driver.

The evaporating heat exchanger 111 within the closed loop evaporates water for the Rankine steam bottoming cycle as the heated air removed from the gas turbine passes in heat exchange relationship with the water circulating between the high pressure evaporator 46 and the exchanger 111 by means of conduits 120 and 122. The evaporating heat exchange within the exchanger 111 may perform all of the evaporating duty for the Rankine steam bottoming cycle, or it may operate in parallel with another evaporator (as shown) that utilizes heat recovered from the gas turbine exhaust gas or other energy source. It will also be appreciated that the exchanger 111 may operate with either natural or forced circulation.

Makeup air is supplied to the closed circuit cooling loop, and specifically to the hot air or gas conduit 114 from the discharge of the gas turbine air compressor 18 via conduit 124. The makeup air enters the cooling loop preferably at any point upstream of the circulating compressor suction and downstream of the gas turbine cooling system discharge. The preferred makeup air entrance point is upstream of the evaporating heat exchanger 111 so that all of the cooling air is cooled to a temperature near the saturation temperature of the water being evaporated. The circulating compressor 112 increases the cooling air pressure to a level higher than the pressure in the gas turbine gas path so that any leakages from the cooling circuit to the gas turbine hot gas path.

If desired, a compressor 126 may be incorporated in the air makeup system to increase the pressure of the cooling circuit above the gas turbine compressor discharge pressure. Higher pressure increases the heat transport characteristics and reduces the size and cost of the piping in the evaporating heat exchanger 111.

High purity and cleanliness of the cooling air can be maintained by blowing down from the tips of the rotating buckets in the gas turbine. The centrifugal force field effectively removes foreign solid particles from the cooling air. Optionally, a filter at the circulating compressor inlet may be applied to maintain cooling fluid cleanliness.

In combined cycles with multiple steam generation systems in the exhaust heat recovery steam generator as described above, that generate steam at progressively lower pressure as the gas turbine exhaust gas is cooled, heat from the gas turbine hot pans is transferred preferentially to the evaporator (i.e., evaporator 46) operating at the highest pressure. The gas turbine cooling system can also be configured to perform film cooling of some hot gas path components by discharging part of the cooling air through film cooling ports to the gas turbine hot gas path. This provides effective part cooling but reduces cycle efficiency.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle system which includes a gas turbine, a steam turbine, and at least one heat recovery steam generator where condensate from the steam turbine is evaporated by exhaust gas from the gas turbine and introduced into the steam turbine, the improvement comprising a closed loop cooling air circuit arranged to cool gas turbine parts wherein cooling air, after passing through the gas turbine, is passed in heat exchange relationship with water from an evaporator in the heat recovery steam generator so as to generate additional steam which is returned to said evaporator.

2. The combined cycle system of claim 1 wherein air in said loop cooling air circuits is circulated by a circulating compressor.

3. The combined cycle system of claim 1 wherein said cooling air in said loop cooling air circuit is used, after passing through the gas turbine, to heat fuel prior to admission of the fuel into the gas turbine.

4. The combined cycle system of claim 3 wherein said fuel passes through a heat exchanger in said closed loop cooling air circuit.

5. The combined cycle system of claim 1 wherein said heat recovery steam generator includes one or more pressures for steam generation.

6. In a combined cycle system which includes a gas turbine, a steam turbine; and at least one heat recovery steam generator including at least one evaporator and where condensate from the steam turbine is evaporated by exhaust gas from the gas turbine and subsequently introduced into the steam turbine, the improvement comprising a closed loop cooling air circuit arranged to cool gas turbine parts wherein cooling air, after passing through the gas turbine is passed in heat exchange relationship with water from said at least one evaporator in the heat recovery steam generator, so as to generate additional steam which is returned to said at least one evaporator.

7. The combined cycle system of claim 6 wherein said cooling air circuit includes an air path which receives cooling air from a gas turbine cooling system discharge; and wherein said cooling air from said gas turbine cooling system discharge is used to heat fuel prior to its admission into the gas turbine.

8. In a combined cycle system which includes a gas turbine, a steam turbine, and at least one heat recovery steam generator where condensate from the steam turbine is evaporated by exhaust gas from the gas turbine and introduced into the steam turbine, the improvement comprising a closed loop cooling air circuit arranged to cool gas turbine parts wherein cooling air, after passing through the gas turbine, is passed in heat exchange relationship with water from an evaporator in the heat recovery steam generator; and wherein said cooling air circuit includes an air path which receives makeup air from a gas turbine compressor discharge.

9. The combined cycle system of claim 8 wherein said makeup air is introduced into said closed loop cooling air circuit by means of a makeup air booster compressor.

10. In a combined cycle system which includes a gas turbine, a steam turbine; and at least one heat recovery steam generator including at least one evaporator and where condensate from the steam turbine is evaporated by exhaust gas from the gas turbine and subsequently introduced into the steam turbine, the improvement comprising a closed loop cooling air circuit arranged to cool gas turbine parts wherein cooling air, after passing through the gas turbine is passed in heat exchange relationship with water from said at least one evaporator in the heat recovery steam generator; and wherein said cooling air circuit includes an air path which also receives makeup air from a gas turbine compressor discharge.

* * * * *